Aug. 23, 1966    D. L. MacFEIGGAN ETAL    3,268,050
TORQUE LIMITER
Filed Sept. 14, 1964
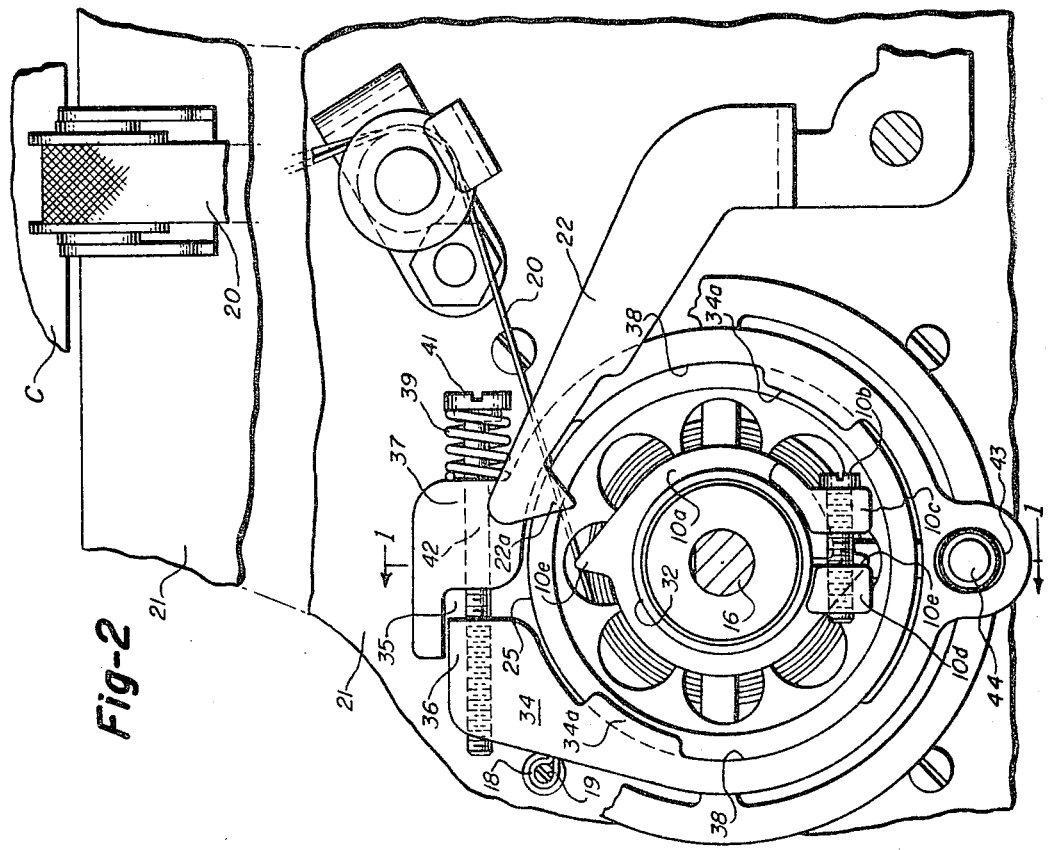
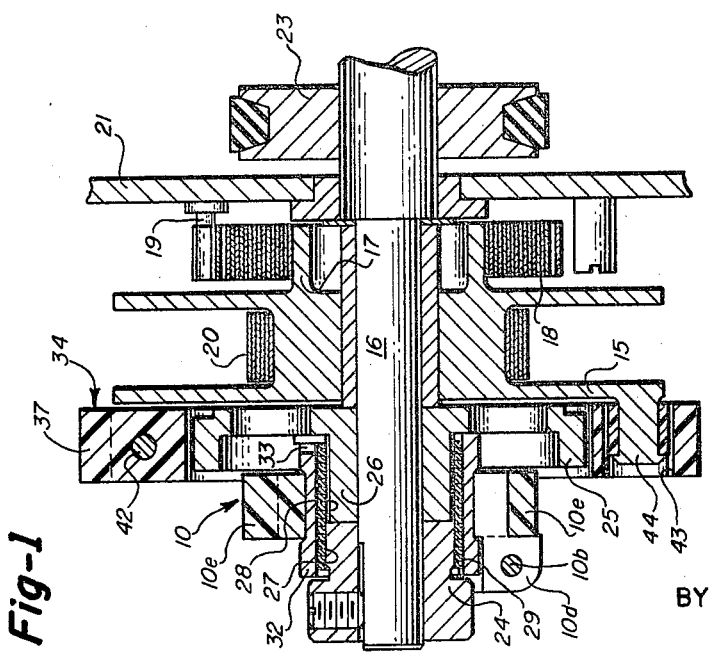
INVENTORS
D. LEE MACFEIGGAN
JOSEPH E. CAMPISI
Thomas S. Ross
BY James R. Black Jr.
ATTORNEYS

3,268,050
TORQUE LIMITER
David Lee MacFeiggan and Joseph E. Campisi, West Hartford, Conn., assignors, by mesne assignments, to Royal Typewriter Company, Inc., New York, N.Y., a corporation of Delaware
Filed Sept. 14, 1964, Ser. No. 396,146
2 Claims. (Cl. 197—65)

This invention relates to an improved torque limiting clutch mechanism for use, for example, in controlling the carriage return in an electrically powered typewriter.

In a broad sense torque limiting mechanisms of this nature are well known in the art. For example, U.S. Patent 2,930,463, discloses a torque limiting clutch that is commercially adapted to control carriage return in an electrically powered typewriter. Clutches of the centrifugal type have been developed, see for example U.S. Patent 1,826,054, for various applications. The concept underlying the disclosure herein concerns an improved torque limiting clutch that is characterized by simplicity of construction by virtue of a minimum number of operating parts, capability of easy adjustment to accommodate operational exigencies and operable reliability under varying commercial circumstances and conditions. The criteria to which this concept is directed are the prevention of a so-called "sling-shot" start of a typewriter carriage, for example, which otherwise could cause an undesired repeat platen index; provision of constant carriage speed during return movement thereof; reduction of strain on and breakage of parts in the carriage return system; and equalization of short stroke banking, such as after the salutation of a letter, where the dashpot cannot respond adequately.

Accordingly, the objects of this invention are to attain the aforementioned criteria as well as others that will appear hereinbelow.

In the drawing wherein similar reference characters refer to similar parts throughout the several views:

FIGURE 1 is a sectional elevation of the mechanism taken along the line 1—1 of FIGURE 2; and FIGURE 2 is a side elevation thereof.

In the drawing there is shown in FIGURE 1 a typewriter carriage return clutch, generally indicated at 10 which is adapted, upon engagement, to connect a carriage return drawband pulley 15 to a power source (not shown) whereby the pulley is rotated to wind a drawband 20 thereon to return the carriage C. The pulley 15 is rotatably mounted on the left end of a constantly rotating power roll shaft 16 and has a hub 17 to which one end of a spiral spring 18 is secured, the other end of the spring being secured to a stud 19 projecting from the left side frame 21 of the typewriter. The drawband 20 (FIGURE 2) is connected at one end to the hub of pulley 15 and at its other end to the carriage C in a manner well known in the art. The spiral spring 18 tends to wind drawband 20 on the pulley 15 to maintain the band under tension at all times thus to prevent overtravel of the pulley during letter feed or tabulation.

As seen in FIGURE 2 a clutch actuator arm 22 is pivoted on a portion of the machine frame and is spring biased in clockwise direction. Upon depression of the carriage return key (not shown) actuator arm 22 is pivoted counterclockwise causing clutch 10 to engage.

The power roll shaft 16 is journalled in the side frame 21, is rotatably driven by a belt and pulley indicated at 23 and has secured to its outer end a carriage return clutch hub 24. Rotatably mounted upon the power roll shaft 16 is a torque limiter drum 25 whose hub 26 extends outwardly and abuts hub 24. Wrapped around the outer surfaces 27 and 28 of hubs 24 and 26 respectively is a helical coupling or wrapped spring 29. Rotatably mounted around the spring 29 is a carriage return clutch actuator sleeve 32, on which in turn, is mounted a multilobed (10e) clutch actuator 10a adapted to be clamped about sleeve 32 by a screw 10b passing through a shoulder 10c and threaded into a shoulder 10d fastened to or integral with actuator 10a. The left hand end of spring 29 is secured to the carriage return hub 24 while the right end is positioned in a slot 33. Actuator 10a is preferably a molded plastic part the resilience of which enables adjustment on sleeve 32 with respect to actuator arm 22 so that lobes 10e can be accurately located with respect to arm end or tooth 22a. The spring 29 is normally expanded to a slight extent to allow a slip fit about hub 26 of the torque limiter drum 25 whereby pulley 15 is normally inactive.

A torque limiter adjustment band 34 (FIGURE 2) opened as at 35 and having shoulders 36 and 37 formed thereon, encircles the drum 25 and, as seen in FIGURE 2, is provided with lands 38 which ride on the periphery of drum 25. A compressed spring 39 is confined between shoulder 37 and the head 41 of an adjustment screw 42 which passes through shoulder 37 and is threaded into shoulder 36. Band 34 is provided with retaining lips 34a on opposite sides thereof (see FIGURE 2) which retain drum 25 in position within the band. By loosening screw 41 sufficiently band 34 may be expanded to permit easy insertion or withdrawal of drum 25 without the necessity of disassembling the entire mechanism. It should be noted that band 34 is preferably fabricated or molded from a suitable plastic having a low coefficient of friction and also having the properties of resilience and toughness such as, for example, "Delrin" AF. Positioned 180 degrees from opening 35 is a slot 43 in band 34 in which is disposed a stud 44 mounted on drawband pulley 15 whereby the pulley and band are interconnected.

When rotation of the clutch actuator 10a is arrested by engagement of the actuator lever 22 in response to a carriage return signal from the typewriter keyboard or elsewhere, sleeve 32 is also arrested thus instantly binding the actuator spring 29 about the hubs 24 and 26. The torque limiter drum 25 accordingly begins to rotate and, through pressure applied by spring 39 on shoulder 37, causes rotation of the carriage return pulley 15. The drum 25 has the capacity to slip relative to the band limiter 34 until the static inertia of the carriage is overcome thus gradually accelerating the carriage and avoiding a sling shot reaction thereof.

If movement of the carriage is impeded in any way during carriage return operation, drum 25 will slip a slight amount within the band limiter 34 before continuing carriage return, thus avoiding sling shot effect and possible damage to the parts.

From the foregoing it will appear that when arm 22 (FIGURE 2) is swung counterclockwise in response to a keyboard or other signal its tooth 22a intercepts one of the lobes 10e on clutch actuator 10a causing wrapped spring 29 to grab surface 28 of torque limiter drum hub 26 thereby connecting torque limiter drum 25 to shaft 16. If the starting torque on pulley 15 is in excess of the coefficient of friction between drum 25 and band 34, the drum will slip a slight amount in relation to the band so that the band, by way of slot 43 and stud 44, will not cause a sling shot start on a drawband pulley 15, but rather will apply a smooth gradually accelerating force thereon. Thus the carriage return will also be initiated smoothly and in a gradually accelerating fashion, and in a short carriage return operation will attenuate the carriage return movement that could not be dampened by the conventional dash pot.

As other embodiments of the invention are possible and as modifications of the one disclosed may be made, all without departing from the scope of the invention it is to be understood that the foregoing should be interpreted as illustrative and not in a limiting sense.

We claim:
1. In an electric typewriter having a frame,
a carriage movable relative to said frame,
a carriage return drawband pulley,
a carriage return drawband secured to said pulley and to said carriage operable to return said carriage upon connection of said pulley to a motor source,
a wrap spring carriage return clutch operable to connect said motor source to a driven member comprising a torque limiter drum,
and a torque limiter band comprising a split molded resilient plastic element releasably encircling the periphery of said torque limiter drum and having a pair of shoulders for the reception of an adjusting screw manipulatable to control the coefficient of friction between said band and said drum whereby the starting torque between said band and drum may be controlled, said band having a slot formed therein for the reception of a stud projecting from said drawband pulley to interconnect said band and said pulley whereby the starting torque between said drum and said pulley may be adjustably controlled.

2. In a powered typewriter having a traversable paper carriage, in combination,
a frame,
a constantly rotating shaft carried by said frame,
a wrapped spring clutch having a hub and including a spring frictionally coiled around said hub, said hub being mounted on the outer end of said shaft,
a driving member secured to said shaft inwardly of said clutch,
a carriage return drawband pulley freely rotatably mounted on said shaft between said clutch and said driving member and having connected thereto one end of a drawband the other end of which is connected to the typewriter carriage,
a clutch actuator sleeve encircling said spring and providing an another for one end thereof,
a clutch actuator encircling said sleeve, said actuator comprising a split plastic band having a pair of opposed shoulders adapted to receive a tightening screw whereby said actuator may be adjustably fastened about said sleeve,
a torque limiter drum freely mounted on said shaft and including a hub encircled normally loosely by the anchored portion of said spring,
a torque limiter band comprising a split molded resilient plastic element releasably encircling the periphery of said torque limiter drum and having a pair of shoulders for the reception of an adjusting screw manipulatable to control the coefficient of friction between said band and said drum whereby the starting torque between said band and said drum may be controlled, said band having a slot formed therein for the reception of a stud projecting from said drawband pulley to interconnect said band and said pulley whereby the starting torque between said drum and said pulley may be adjustably controlled,
and a carriage drawband spring having one of its ends connected to said pulley and its other end connected to said frame.

References Cited by the Examiner
UNITED STATES PATENTS

| | | | |
|---|---|---|---|
| 1,266,550 | 5/1918 | Carroll | 192—81 X |
| 2,104,559 | 1/1938 | Hillis | 197—65 X |
| 2,566,539 | 9/1951 | Starkey. | |
| 2,567,937 | 9/1951 | Hart | 197—66 |
| 2,729,322 | 1/1956 | Kloski | 197—66 |
| 2,915,158 | 12/1959 | Smith | 192—81 |
| 2,930,463 | 3/1960 | Dodge et al. | 192—81 |
| 3,095,071 | 6/1963 | Mason | 192—81 |

ROBERT E. PULFREY, *Primary Examiner.*

ERNEST T. WRIGHT, *Assistant Examiner.*